United States Patent [19]
Kilstofte

[11] Patent Number: 4,698,706
[45] Date of Patent: Oct. 6, 1987

[54] REVERSIBLE DRIVE MECHANISM FOR A MAGNETIC TAPE IN A MAGNETIC TAPE RECORDER

[75] Inventor: Richard B. Kilstofte, Long Beach, Calif.

[73] Assignee: Fortel, Inc., Compton, Calif.

[21] Appl. No.: 887,655

[22] Filed: Jul. 21, 1986

Related U.S. Application Data

[63] Continuation-in-part of Ser. No. 677,991, Dec. 4, 1984, abandoned.

[51] Int. Cl.4 .................. G11B 15/24; G11B 15/29
[52] U.S. Cl. ................... 360/96.4; 360/96.1; 226/154; 242/200
[58] Field of Search .................. 360/96.1, 96.4; 226/154, 186; 242/200, 201

[56] References Cited

U.S. PATENT DOCUMENTS 4,358,804 11/1982 Uehara ........................ 360/96.4
4,571,644 2/1986 Fukuda ........................ 360/96.4

Primary Examiner—Robert S. Tupper
Attorney, Agent, or Firm—Keith D. Beecher

[57] ABSTRACT

A drive mechanism for a magnetic tape recorder which uses a single reversible electric motor that drives the magnetic tape in the recorder in the forward direction through a pinch roller-capstan drive assembly, and which automatically disengages the pinch roller from the capstan so that the tape may be rewound at high speed when the motor is reversed.

4 Claims, 4 Drawing Figures

4,698,706

REVERSIBLE DRIVE MECHANISM FOR A MAGNETIC TAPE IN A MAGNETIC TAPE RECORDER

This application is a continuation-in-part of Copending Application, Ser. No. 677,991 filed Dec. 4, 1984, now abandoned.

BACKGROUND OF THE INVENTION

It is the usual practice in the prior art magnetic recorders to provide either manual means or power consuming solenoid means to disengage the pinch roller from the capstan during the rewind operation. This is in order that the tape may move freely at high speed in the reverse direction during the rewind operation.

The present invention provides a simple gear linkage mechanism by which the drive motor itself serves automatically to disengage the pinch roller when the drive motor is reversed, so that the tape may be rewound at high speed with out any need for manual or solenoid operated mechanisms to disengage the pinch roller.

DETAILED DESCRIPTION OF THE ILLUSTRATED EMBODIMENT

Figure 1:
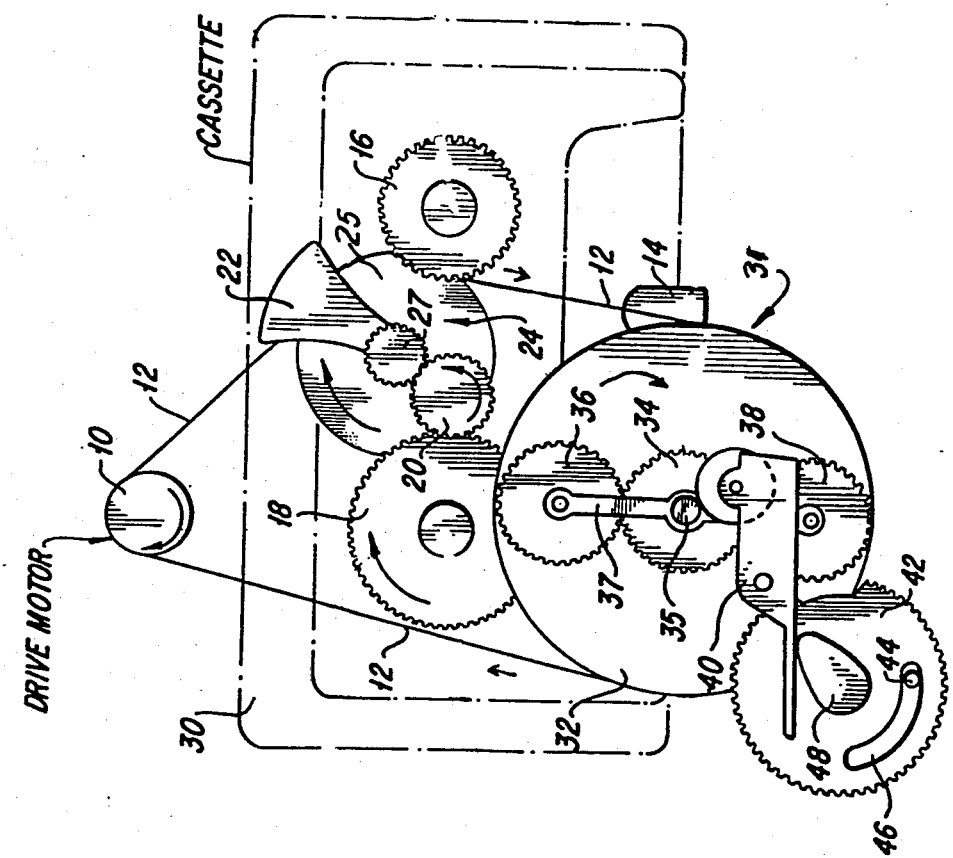
FIG. 1 is a somewhat schematic representation of the mechanism of the invention during the play mode, in which the magnetic tape in the tape recorder is driven in the forward direction.

The magnetic tape recorder which is controlled by the mechanism of the invention includes a cassette 30, which in turn includes a magnetic tape, together with supply and take-up reels. When the cassette is in place, the tape is driven by a capstan 35 past a transducer head 14 during the normal play mode of the tape recorder.

A drive gear 16 is mounted coaxially with the supply reel of cassette 30, and a drive gear 18 is mounted coaxially with the take-up reel. A centrifugal clutch 24 is mounted between the drive gears 16 and 18. The centrifugal clutch includes a pulley 25 which is rotatably driven by a reversible motor 10 through a belt 12. The clutch also includes a gear 27 which is fixed to pulley 25 in coaxial relationship with the axis of rotation of the pulley. The clutch assembly further includes an idler gear 20 which is rotatably mounted on the pulley and which is coupled to gear 27.

When motor 10 is driven in a clockwise direction, clutch 24 assumes the position shown in FIG. 1, in which gear 20 of the centrifugal clutch 24 is driven by a centrifugal weight 22 into coupled relationship with gear 18. Then, rotation of the pulley 25 by motor 10 causes the gear 18 to rotate the take-up reel of the cassette for normal play operation, during which the tape is drawn across head 14 by capstan 35. During the play operation, the mechanism 31 enables a pinch roller assembly 40 to pinch the tape against the capstan so that the capstan may drive the tape.

The mechanism 31 comprises a pulley 32 which is driven by motor 10 through belt 12. A pivot gear 34 is coaxially mounted on pulley 32 for rotation about the axis of rotation of the pulley as the pulley rotates. A pair of idler gears 36 and 38 are supported on diametrically opposite sides of the gear 34 by an elongated bracket 37.

Capstan 35 is driven by pulley 32 about the axis of rotation of the pulley. The pinch roller 40 is normally biased into engagement with the capstan 35, so that the tape the cassette may be pinched between the capstan and the pinsh roller to be drawn across the head 14 by the capstan when the recorder is in its normal play mode.

A cam gear 42 is rotatably mounted on the chassis of apparatus, and it includes a cam 48. Cam 48 is rotated by gear 42 to engage the pinch roller 40 and move the pinch roller against its spring bias away from capstan 35, as the cam 48 and cam gear 42 rotate in a counter-clockwise direction. The amount of rotation of cam 48 is limited by a stop 44 which extends through an arcuate slot 46 in gear 42.

During the normal play mode, the elongated bracket 37 is moved by centrifugal action against a first stop (not shown) to assume the position shown in FIG. 1. While bracket 37 is in the position of FIG. 1, gear 34 causes both idler gears 36 and 38 to rotate freely, with idler gear 38 rotating freely within a hiatus arcuate section of gear 42. During the position of the mechanism 31 illustrated in FIG. 1, pinch roller 40 pinches the tape against capstan 35, so that the capstan draws the tape across head 14, as mentioned above. During this normal play operation, clutch 22 causes gear 20 to engage gear 18 of the take-up reel, so that the take-up reel is rotated during the normal play operation to accept the tape as it is drawn past head 14 from the supply reel by capstan 35.

Figure 2:
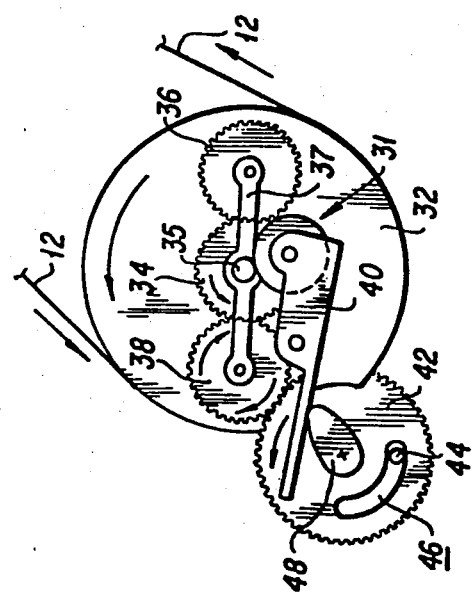
FIG. 2 is a representation of the mechanism when the drive motor is reversed.

The normal play mode shown in FIG. 1 continues until drive motor 10 is reversed. When that occurs, the centrifugal clutch 24 couples the drive motor to drive gear 16 of the supply reel to rotate the supply reel for rewind operation. Also, and as shown in FIG. 2, pulley 32 of mechanism 31 is rotated in a counterclockwise direction causing bracket 37 to turn by centrifugal action against a second stop so that idler gear 36 engages cam gear 42.

Figure 3:
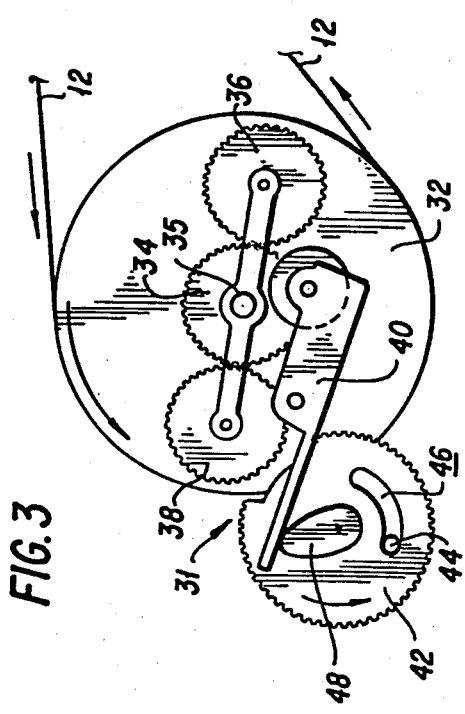
FIG. 3 is a representation of the mechanism when the drive motor drives the tape in the reverse direction for rewind purposes.
Figure 4:
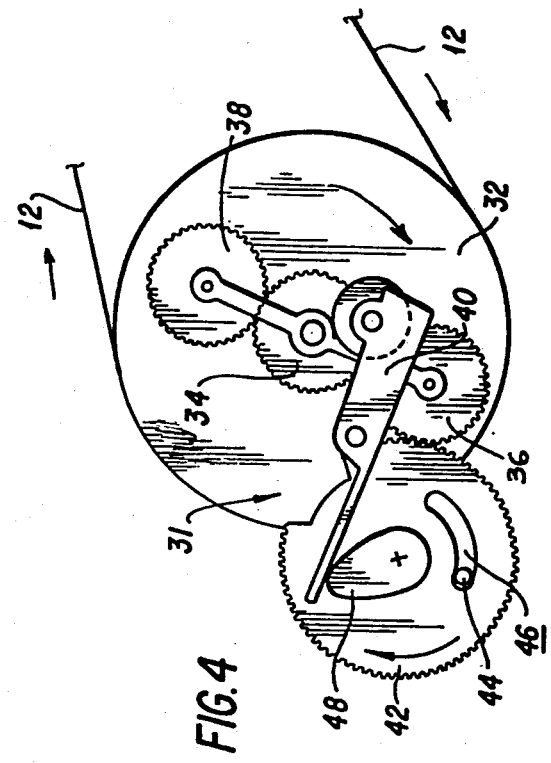
FIG. 4 is a representation of the mechanism when the drive motor is returned to its forward direction.

This latter action causes the cam gear 42 to rotate in a counterclockwise direction causing cam 48 to move the pinch roller 40 away from capstan 35, releasing the tape. This counterclockwise direction continues until the idler gear 38 is opposite to the hiatus portion of the cam gear 42, as shown in FIG. 3. During the latter position, the end of arcuate slot 46 engages stop 44. The cam 48 is moved beyond the top dead-center position, and it assumes the position shown in FIG. 3 to hold the pinch roller 40 disengaged from the capstan 35. The position of FIG. 3 represents the rewind mode, during which the tape is rewound rapidly by the drive motor operating in its reverse condition.

The rewind operation continues until motor 10 is again reversed, as shown in FIG. 1, causing bracket 37 to turn back to its first stop by centrifugal action. The idler gear 38 now engages cam gear 42 to rotate the cam gear 42 in a counterclockwise direction back to the position shown in FIG. 1, at which pinch roller 40 again pinches the tape against capstan 35 to enable the tape recorder to resume its normal play mode.

Accordingly, the tape recorder incorporating the mechanism shown in FIGS. 1, 2, 3 and 4 is capable of being placed in its normal play position, merely by causing motor 10 to rotate, for example, in a clockwise direction, during which the mechanism 31 assumes the position shown in FIG. 1, in which the pinch roller 40 pinches the tape against capstan 35. This mode continues, until the motor is reversed, which causes the mechanism 31 to assume the position shown in FIG. 3, during which the pinch roller 40 is displaced from the capstan 35. During the latter position, the gravity clutch 25 causes gear 20 to disengage the gear 18 associated with the take-up reel, and to engage gear 16 associated with the supply reel, causing the gear 16 to rotate the supply reel in the proper direction to take up the tape as the motor is reversed.

It will be appreciated that while a particular embodiment of the invention has been shown and described, modifications may be made. It is intended in the claims to cover all modifications which come within the true spirit and scope of the invention.

I claim:

1. A mechanism for controlling the magnetic tape in a cassette-type tape recorder, and which includes: a reversible drive motor; a rotatable drive capstan for the magnetic tape; a member affixed to the capstan and rotatable about the axis of rotation of the capstan, said member being mechanically coupled to the drive motor to be rotated in a first and second direction about the axis of rotation of said capstan; a drive gear attached to said member for rotation thereby about said axis of rotation; first and second idler gears, and a freely rotatable support bracket mounted on said capstan for angular movement about said axis of rotation of said capstan and supporting said first and second idler gears in coupled relationship with said drive gear; a spring-biased pinch roller assembly; means pivotally mounting said pinch roller assembly adjacent to said capstan for angular movement about an axis of rotation displaced from the axis of rotation of said capstan; a further gear rotatably mounted about an axis displaced from said axis of rotation of said capstan to be engaged selectively by said first and second idler gears as said bracket is turned by centrifugal force to first and second positions as said member rotates in said first and second directions, said further gear having a gear hiatus of a particular arcuate length; and a cam attached to said further gear to be turned thereby as said further gear is moved angularly by said first and second gears, said cam engaging said pinch roller assembly to move said pinch roller assembly out of engagement from said capstan against the spring bias thereof when said further gear is turned by one of said idler gears in a particular direction.

2. The mechanism defined in claim 1, in which said support bracket has a linear configuration, and in which said first and second idler gears are supported thereby in diametrically opposite relationship with respect to said drive gear.

3. The mechanism defined in claim 1, in which the tape recorder receives a magnetic tape cassette having a take-up reel and a supply reel, and in which the tape recorder includes a first gear coupled to said take-up reel for driving the take-up reel and a second gear coupled to said supply reel for driving the supply reel, and clutch means coupling said last-named first and second gears to said drive motor to cause the drive motor to drive the take-up reel when rotating in one direction and to drive the supply reel when rotating in the opposite direction.

4. The mechanism defined in claim 3, in which said clutch means comprises a centrifugal type of clutch.

* * * * *